US012564888B2

(12) United States Patent
Roth et al.

(10) Patent No.: US 12,564,888 B2
(45) Date of Patent: Mar. 3, 2026

(54) POWER TOOL AND A TRANSMISSION THEREFOR

(71) Applicant: Black & Decker Inc., New Britain, CT (US)

(72) Inventors: Jörg Roth, Schwalheim (DE); Michael Kunz, Dorndorf (DE); Rafael Gottschling, Selters-Eisenbach (DE)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/609,876

(22) Filed: Mar. 19, 2024

(65) Prior Publication Data

US 2024/0316656 A1     Sep. 26, 2024

(30) Foreign Application Priority Data

Mar. 21, 2023     (EP) ..................................... 23163288

(51) Int. Cl.
    B23B 45/00        (2006.01)
    B23B 45/02        (2006.01)
    B23B 51/04        (2006.01)

(52) U.S. Cl.
    CPC .......... B23B 45/008 (2013.01); B23B 45/001 (2013.01); B23B 45/02 (2013.01); B23B 51/042 (2013.01); B23B 2260/044 (2013.01)

(58) Field of Classification Search
    CPC ..... B23B 45/008; B23B 45/001; B23B 45/02; B23B 51/042; B23B 2260/044
    See application file for complete search history.

(56) References Cited

U.S. PATENT DOCUMENTS

| | | | |
|---|---|---|---|
| 2,526,976 A * | 10/1950 | Smith | B23B 45/02 144/1.1 |
| 3,134,275 A | 5/1964 | Davison | |
| 3,178,956 A | 4/1965 | Stanley | |
| 3,500,696 A | 3/1970 | Berube | |
| 4,403,679 A * | 9/1983 | Snider | F16H 1/14 173/218 |
| 5,022,800 A * | 6/1991 | Vindez | B23Q 5/402 173/19 |

(Continued)

FOREIGN PATENT DOCUMENTS

| | | |
|---|---|---|
| CN | 209918947 U | 1/2020 |
| DE | 3526150 A1 | 2/1986 |

(Continued)

OTHER PUBLICATIONS

Extended European Search Report mailed Jul. 27, 2023 in corresponding EP application No. 23163288.6, 9 pages.

(Continued)

*Primary Examiner* — Michelle Lopez
(74) *Attorney, Agent, or Firm* — Brake Hughes Bellermann LLP

(57) ABSTRACT

A power tool including a housing and a motor mounted in the housing having a drive shaft. A transmission is mounted in the housing having an input shaft operatively coupled to the drive shaft of the motor and an output shaft operatively coupled to a tool holder. The transmission includes at least a first gear and a second gear configured to transmit torque from the motor to the tool holder. A first part of the transmission is mounted within a first grease chamber and a second part of the transmission is mounted within a second grease chamber.

20 Claims, 9 Drawing Sheets

(56) References Cited

U.S. PATENT DOCUMENTS

| | | | | |
|---|---|---|---|---|
| 5,143,161 A * | 9/1992 | Vindez | .................. | B23Q 11/04 |
| | | | | 173/19 |
| 6,793,023 B2 | 9/2004 | Holzer et al. | | |
| 8,286,725 B2 * | 10/2012 | Arich | .................... | B25D 16/00 |
| | | | | 92/158 |
| 8,911,320 B2 | 12/2014 | Tokunaga et al. | | |
| 2008/0271906 A1 | 11/2008 | Walker | | |
| 2009/0277657 A1 * | 11/2009 | Berger | .................... | F16N 29/02 |
| | | | | 173/171 |
| 2017/0284509 A1 | 10/2017 | Erhardt et al. | | |
| 2019/0176314 A1 | 6/2019 | Liu | | |
| 2020/0101546 A1 | 4/2020 | Rose et al. | | |
| 2020/0108453 A1 | 4/2020 | Carlson et al. | | |
| 2021/0107131 A1 | 4/2021 | Kuehne et al. | | |

FOREIGN PATENT DOCUMENTS

| | | | |
|---|---|---|---|
| DE | 102013221117 A1 | 5/2015 | |
| DE | 102015212602 A1 | 1/2017 | |
| DE | 102012110213 B4 | 10/2020 | |
| DE | 102012110214 B4 | 10/2020 | |
| EP | 2471634 B1 | 10/2015 | |
| EP | 2206572 B2 | 7/2017 | |
| EP | 3561339 B1 | 9/2020 | |
| EP | 4043129 A1 | 8/2022 | |
| EP | 3461594 B1 | 5/2024 | |
| GB | 926726 A | 5/1963 | |
| GB | 2058253 A | 4/1981 | |

OTHER PUBLICATIONS

Extended European Search Report mailed Jul. 27, 2023 in EP application No. 23163287.8, 10 pages.

Extended European Search Report mailed Jul. 27, 2023 in EP application No. 23163289.4, 9 pages.

Non-Final Office Action dated Mar. 24, 2025 issued in U.S. Appl. No. 18/608,382.

Non-Final Office Action dated Mar. 25, 2025 issued in U.S. Appl. No. 18/610,572.

* cited by examiner

POWER TOOL AND A TRANSMISSION THEREFOR

CROSS REFERENCE TO RELATED APPLICATIONS

This application claims the benefit of EP application Ser. No. 23163288.6 filed on Mar. 21, 2023, the entire disclosure of which is incorporated herein by reference.

FIELD

The present disclosure relates to a power tool and a transmission therefor.

BACKGROUND

Some heavy-duty power tools such as core drills have a transmission with several different gearings. This allows the user to adjust the speed and tool of the tool holder of the power tool according to the requirements of the workpiece.

It is known for some power tools to have a transmission with an internal draw key for selecting different gears as shown in US 2017/0284509. The transmission must be inactive before the draw key selects a different gear. This is because the transmission can jam on the draw key if moved during operation. This may be inconvenient for the user since the power tool must be inactive for the user to correctly adjust the gearing of the transmission.

It is also known to provide lubricant to the transmission of the power tool. This is shown in EP4043129. In some power tools with lubricated transmission, the orientation of the power tool may affect the location of the lubricant in the power tool. Accordingly, if the power tool is used overhead or in a generally vertical orientation, some of the lubricant can flow away from parts of the transmission. This means that the transmission may not be adequately lubricated in some operations.

The power tool shown in EP4043129 has a shift lever mechanism is adjacent to the side of the drive gears. This means that the side of the gear case has a large radial dimension which is the widest part of the power tool. This means that the power tool may be harder to use in restricted spaces.

SUMMARY

According to an aspect of the present disclosure an example embodiment includes a power tool comprising: a housing; a motor mounted in the housing having a drive shaft; a transmission mounted in the housing having an input shaft operatively coupled to the drive shaft of the motor and an output shaft operatively coupled to a tool holder; wherein the transmission comprises at least a first gear and a second gear configured to transmit torque from the motor to the tool holder; wherein a first part of the transmission is mounted within a first grease chamber and a second part of the transmission is mounted within a second grease chamber.

Optionally, the first grease chamber and the second grease chamber are defined at least in part by one or more walls of the housing.

Optionally, the first grease chamber and the second grease chamber are separated by a baffle fixed to the housing.

Optionally, the first and second grease chambers are in fluid communication.

Optionally, the first and second grease chambers are connected via a grease connection conduit.

Optionally, a gear selection rod is moveable within connection conduit.

Optionally, the first and second grease chambers are sealed.

Optionally, the first grease chamber comprises the first and second gears.

Optionally, an intermediate shaft comprises a first idling gear and a second idling gear configured to respectively engage first gear and the second gear and the first idling gear and the second idling gear are fixed with respect to each other and the first idling gear and the second idling gear are mounted in the first grease chamber.

Optionally, the transmission comprises a clutch and the clutch is mounted in the second grease chamber.

Optionally, the transmission comprises a gear selection mechanism mounted in the second grease chamber.

Optionally, a first lubricant type is held in the first grease chamber and a second lubricant type is held in the second grease chamber.

Optionally, the first and second grease chambers are not in fluid communication with each other.

Optionally, the first gear and/or the second gear comprises at least one pocket between a gear periphery and a gear center configured to receive grease.

Optionally, the power tool is a core drill.

In another aspect of the present disclosure an example embodiment includes a power tool comprising: a motor having a drive shaft; a transmission having an input shaft operatively coupled to the drive shaft of the motor and an output shaft operatively coupled to a tool holder; wherein the transmission comprises at least a first gear and a second gear configured to transmit torque from the motor to the tool holder, and a gear selection key moveable between a first position and a second position and configured to engage the first gear to the output shaft in the first position such that the torque is transmitted from the motor to the tool holder via the first gear and configured to engage the second gear to the output shaft in the second position such that the torque is transmitted from the motor to the tool holder via the second gear; wherein the first position and the second position are separated by a distance greater than a width of the gear selection key.

Optionally, the gear selection key is moveable within the first gear and second gear and configured to engage an internal surface of the first and second gear.

Optionally, the first and second gears are rotatably mounted on a gear sleeve connected to the output shaft and at least part of the gear selection key is moveable within the gear sleeve.

Optionally, the first and second gears are configured to rotate with respect to the gear sleeve when not in engagement with the gear selection key and configured to rotate together with the gear sleeve when in engagement with the gear selection key.

Optionally, the transmission comprises a third gear and the gear selection key is moveable between the first position, the second position and a third position, wherein the gear selection key is configured to couple the third gear to the output shaft in the third position such that the torque is transmitted from the motor to the tool holder via the third gear.

Optionally, the first and second gears are rotatable about a common rotation axis and the gear selection key is moveable in a direction parallel with the common rotation axis.

Optionally, the common rotation axis is coaxial with a rotation axis of the output shaft and the tool holder.

Optionally, an intermediate shaft comprises a first idling gear and a second idling gear configured to respectively engage first gear and the second gear and the first idling gear and the second idling gear are fixed with respect to each other.

Optionally, the rotational axis of the intermediate shaft is parallel with a rotational axis of the output shaft.

Optionally, the gear selection key is mounted on a moveable gear selection rod.

Optionally, the movable gear selection rod is operatively coupled to a gear selection actuator.

Optionally, the first gear and the second gear each comprise at least one key slot configured to receive the gear selection key.

Optionally, the gear selection key is rectangular in cross-section.

Optionally, the transmission comprises a clutch.

Optionally, the gear selection key comprises spring loaded locking ball configured to engage with a first and second recess respectively corresponding to the gear selection key in the first and second positions.

Optionally, the gear selection key comprises a synchronisation spring configured to urge the gear selection key in a direction towards the first position.

Optionally, the power tool is a core drill.

Optionally, the first gear and/or the second gear comprises at least one weight reduction pocket between a gear periphery and a gear center.

In another aspect of the present disclosure an example embodiment includes a transmission for a power tool comprising: an input shaft operatively coupled to a drive shaft of a motor and an output shaft operatively coupled to a tool holder; a first gear and a second gear configured to transmit torque from the motor to the tool holder, and a gear selection key moveable between a first position and a second position and configured to engage the first gear to the output shaft in the first position such that the torque is transmitted from the motor to the tool holder via the first gear and configured to engage the second gear to the output shaft in the second position such that the torque is transmitted from the motor to the tool holder via the second gear; wherein the first position and the second position are separated by a distance greater than a width of the gear selection key.

In another aspect of the present disclosure an example embodiment includes a power tool comprising: a motor having a drive shaft; a transmission having an intermediate shaft with a first rotation axis operatively coupled to an output shaft with a second rotation axis connected to a tool holder and the intermediate shaft is operatively coupled to the motor drive shaft via an input shaft having a third rotation axis, wherein the output shaft comprises at least a first gear and a second gear and the intermediate shaft comprises at least a first idling gear and a second idling gear configured to respectively engage the first gear and the second gear such that the transmission is configured to transmit torque from the motor to the tool holder via a first gearing or a second gearing; and a gear selection mechanism moveable within the output shaft and configured to selectively engage the first gear or the second gear; wherein each of the first rotation axis, the second rotation axis and the third rotation axis are offset from each other in a first direction and a second direction.

Optionally, the first direction and the second direction are perpendicular to each other.

Optionally, a first plane defined by the first direction and the second direction is perpendicular to the first rotation axis.

Optionally, the input shaft comprises a clutch.

Optionally, the first and second gears overlap at least a portion of the first idling gear and the second idling gear and the clutch.

Optionally, the first rotation axis, the second rotation axis and the third rotation axis are parallel to each other.

Optionally, the clutch comprises a first reduction pinion and a second reduction pinion and the first reduction pinion engages a drive gear mounted on the drive shaft and the second reduction pinion engages a reciprocal reduction gear mounted on the intermediate shaft.

Optionally, the motor comprises a motor rotation axis which is parallel with one or more of the first rotation axis, the second rotation axis and the third rotation axis.

Optionally, the gear selection mechanism comprises a gear selection key moveable within the first gear and second gear between a first position and a second position and configured to engage the first gear to the output shaft in the first position such that the torque is transmitted from the motor to the tool holder via the first gear and configured to engage the second gear to the output shaft in the second position such that the torque is transmitted from the motor to the tool holder via the second gear.

Optionally, the gear selection key is moveable within the first gear and second gear and configured to engage an internal surface of the first and second gear.

Optionally, the first and second gears are rotatably mounted on a gear sleeve connected to the output shaft and at least part of the gear selection key is moveable within the gear sleeve.

Optionally, the first and second gears are configured to rotate with respect to the gear sleeve when not in engagement with the gear selection key and configured to rotate together with the gear sleeve when in engagement with the gear selection key.

Optionally, the power tool is a core drill.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
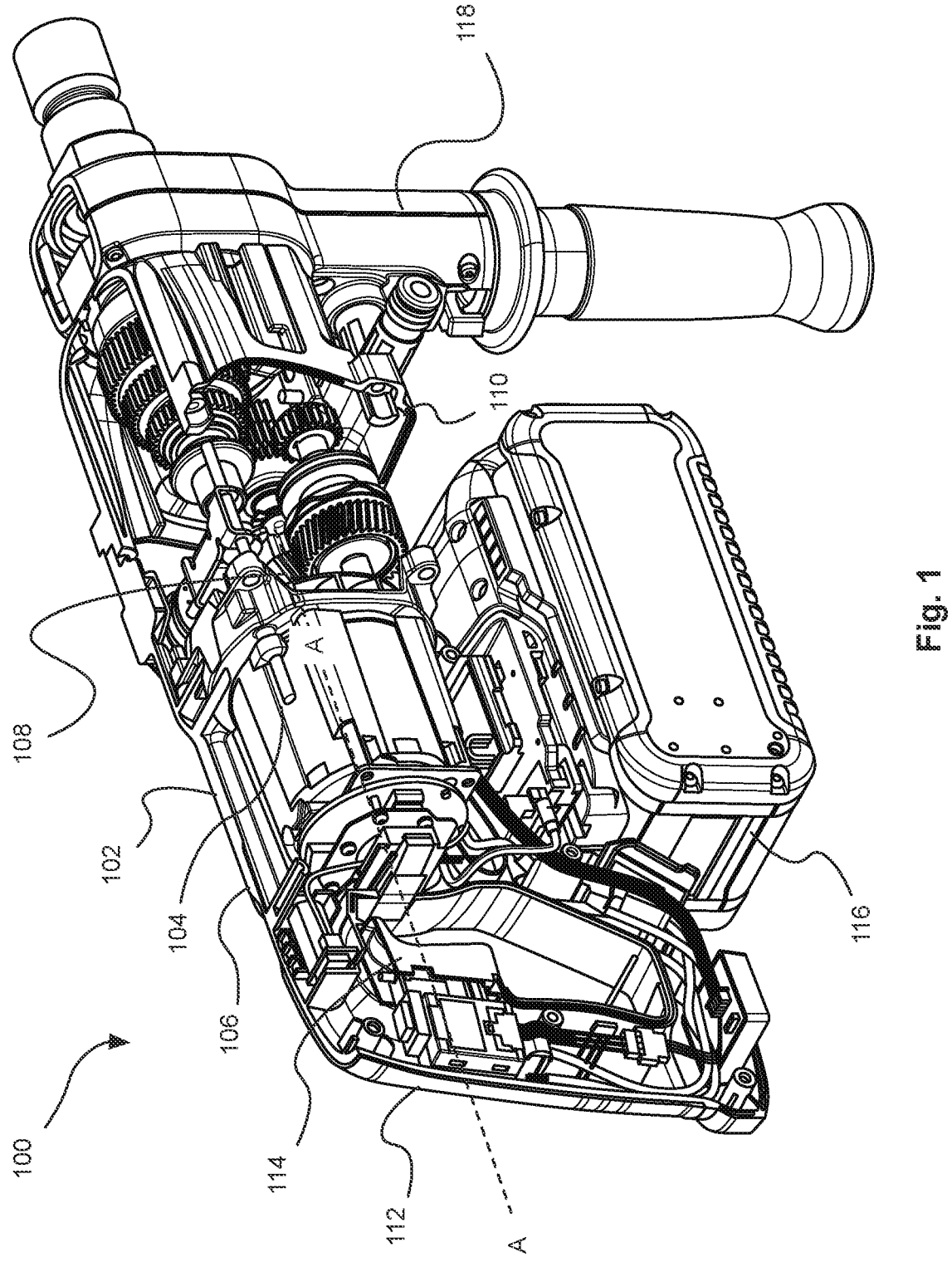
FIG. 1 shows a perspective cut away view of a power tool according to an example.

FIG. 1 shows a perspective cut away view of a power tool 100. The power tool 100 as shown in FIG. 1 is a core drill 100, but hereinafter, the core drill 100 will be referred to as a power tool 100. In other examples any other type of power tool 100 can be used such as a drill, a multitool, a hammer drill or an oscillating or any other power tool 100 which comprises a transmission with a plurality of gears.

The power tool 100 comprises a housing 102. The housing 102 comprises a clam shell type construction having two halves which are fastened together. The halves of the housing 102 are fastened together with screws but in alternative examples any suitable means for fastening the housing 102 together may be used such as glue, clips, bolts and so on. For the purposes of clarity, the fastenings in the housing 102 are not shown in FIG. 1. As mentioned above, FIG. 1 shows part of the housing 102 cut away, but the housing 102 completely shields the internal components of the power tool 100.

An electric motor 104 is mounted in a motor housing portion 106 of the housing 102. The electric motor 104 drives a motor drive shaft (not shown) and a motor drive pinion 108 is mounted on the motor drive shaft. The electric motor 104 is arranged to drive an output shaft 202 via a transmission 200 (best shown in FIG. 2). The motor drive shaft has a rotation axis about a motor rotation axis A-A as shown in FIG. 1.

Figure 2:
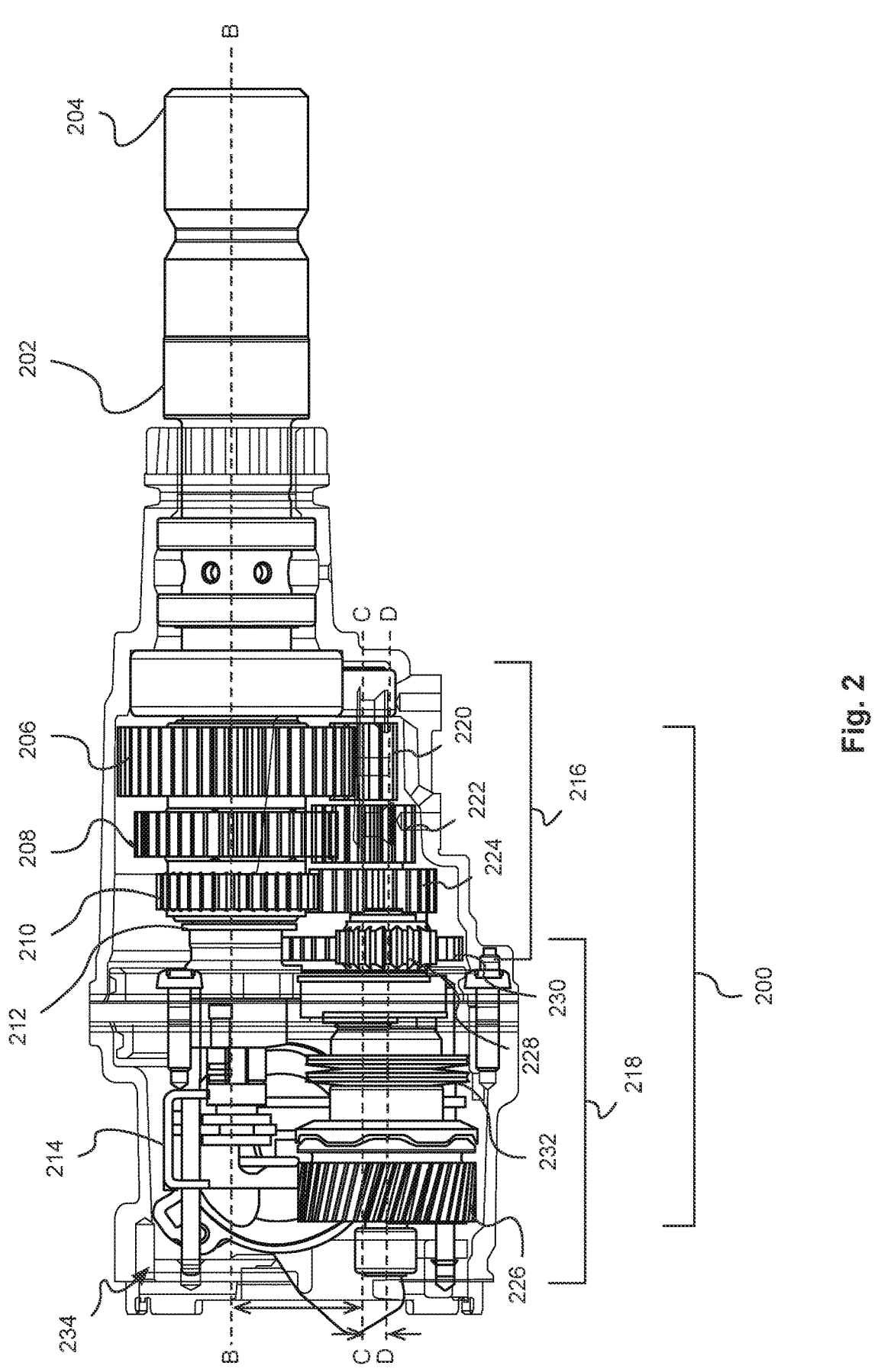
FIG. 2 shows a first side view of a transmission of a power tool according to an example.

The motor drive shaft is substantially parallel to an output shaft rotation axis B-B (also best shown in FIG. 2). FIG. 2 shows a first side view of the transmission 200 of the power tool 100. The output shaft 202 is connected to a tool holder 204 for receiving and holding a tool (not shown) such as a cutting tool (not shown) or a screwdriver bit (not shown). Indeed, any suitable rotary tool can be mounted to the tool holder 204.

Turning back to FIG. 1, the housing 102 comprises a gear housing portion 110 (partially cut away in FIG. 1). The gear housing portion 110 is optionally removably mountable to the housing 102 e.g., the motor housing portion 106. The gear housing portion 110 is fastened together with screws (not shown) but in alternative examples any suitable means for fastening the gear housing portion 110 to the housing 102 may be used such as glue, clips, bolts and so on. Alternatively, the gear housing portion 110 is integral with other parts of the housing 102 e.g., the motor housing portion 106.

The transmission 200 is mounted within the gear housing portion 110. The transmission 200 is arranged to transmit torque from the motor drive shaft to the tool holder 204. The transmission 200 comprises a plurality of gears which provide a different plurality of gearings which will be discussed in more detail below. This means that the user can adjust the speed and torque applied to the output shaft 202 and the tool holder 204.

As shown in FIG. 1, the housing 102 comprises a first handle 112 for the user to grip during use. A trigger button 114 is mounted on the first handle 112 which is used by the user to activate the electric motor 104. The electric motor 104 is electrically connected to a battery pack 116. The battery pack 116 is removably mountable to the housing 102 on the underside of the housing 102. In some examples, the battery pack 116 is integral to the housing 102 and not removable. Alternatively in other examples the power tool 100 is powered additionally or alternatively with mains power (not shown). A second handle 118 is also provided for the user to grip during use.

Figure 3:
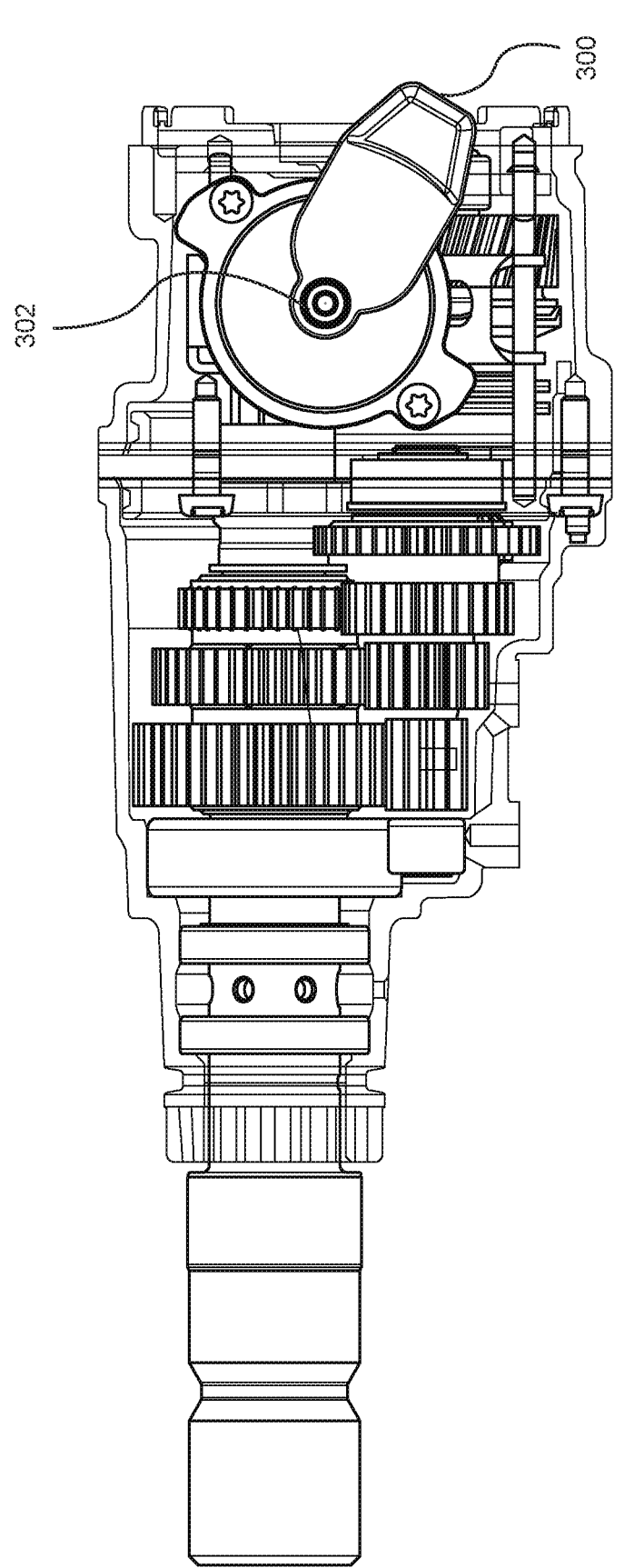
FIG. 3 shows a second side view of a transmission of a power tool according to an example.

The transmission 200 will now be discussed in more detail with respect to FIGS. 2 and 3.

A gear selection actuator 300 is mounted on the side of the housing 102 and configured to select different gearings of the transmission 200. The gear selection actuator 300 is shown in FIG. 3. FIG. 3 shows a second side view of the transmission 200 of the power tool 100. In some examples, the gear selection actuator 300 is pivotally mounted on the side of the gear housing portion 110. In some other examples, the gear selection actuator 300 is mounted on the side of the motor housing portion 106 or another location on the housing 102. The gear selection actuator 300 is moveable into a plurality of gear selection positions, each gear selection position respectively corresponds to a different gearing mode of the transmission 200.

The gear selection actuator 300 is pivotally mounted to the housing 102 via pivot 302. The gear selection actuator 300 pivots about the pivot 302 and moves between the different gear selection positions. The pivot axis of the gear selection actuator 300 is perpendicular to the output shaft rotation axis B-B. Whilst FIG. 3 shows that the gear selection actuator 300 is pivotally mounted to the housing 102, the gear selection actuator 300 can be moveable mounted to the housing 102 in any other suitable way. For example, the gear selection actuator 300 can be slidably mounted on the housing 102 to change the gearing of the transmission 200. In other examples, the actuation can be provided by a ring (not shown) in-line with the output shaft rotation axis B-B.

The transmission 200 as shown in FIG. 2 comprises three different gearings. The different gearings correspond to the torque from the electric motor 104 being transmitted to the tool holder 204 via different gears. In some examples, the transmission 200 comprises a first gear 206, a second gear 208 and a third gear 210. Each of the first gear 206, the second gear 208 and the third gear 210 are rotatably mounted on a gear sleeve 212 connected to the output shaft 202. The first gear 206, the second gear 208, the third gear 210 and the gear sleeve 212 rotate about the output shaft rotation axis B-B.

Each of the first gear 206, the second gear 208 and the third gear 210 are configured to rotate with respect to each other. The first gear 206, the second gear 208 and the third gear 210 are selectively coupled to the gear sleeve 212 and the output shaft 202. When one of the first gear 206, the second gear 208 and the third gear 210 is coupled to the gear sleeve 212, that gear rotates together with the gear sleeve 212. The other of the first gear 206, the second gear 208 and the third gear 210, then rotate with respect to the gear sleeve 212.

Only one of the first gear 206, the second gear 208 and the third gear 210 is engaged with the output shaft 202 and the gear sleeve 212 at a time. When the first gear 206, the second gear 208 and the third gear 210 are not engaged with the gear sleeve 212, they are idle and do not transmit torque to the output shaft 202.

Whilst the transmission 200 as shown in the Figures comprises three different gearings, in other examples there can be any number of gearings. For example, the transmission 200 can comprise only two gearings. Alternatively, the transmission 200 can comprise four, five, etc gearings. The features described with respect to the transmission 200 can be applied to a transmission 200 with any number of gearings and a transmission 200 with any number of gears.

The transmission 200 is operatively coupled to the gear selection actuator 300 via a gear selection mechanism 234. The gear selection mechanism 234 is configured to change the gearing of the transmission 200. In some examples, the gear selection mechanism 234 comprises a selection bracket 214. The selection bracket 214 is configured to move in a direction parallel to the output shaft rotation axis B-B when the gear selection actuator 300 is rotated.

Figure 6:
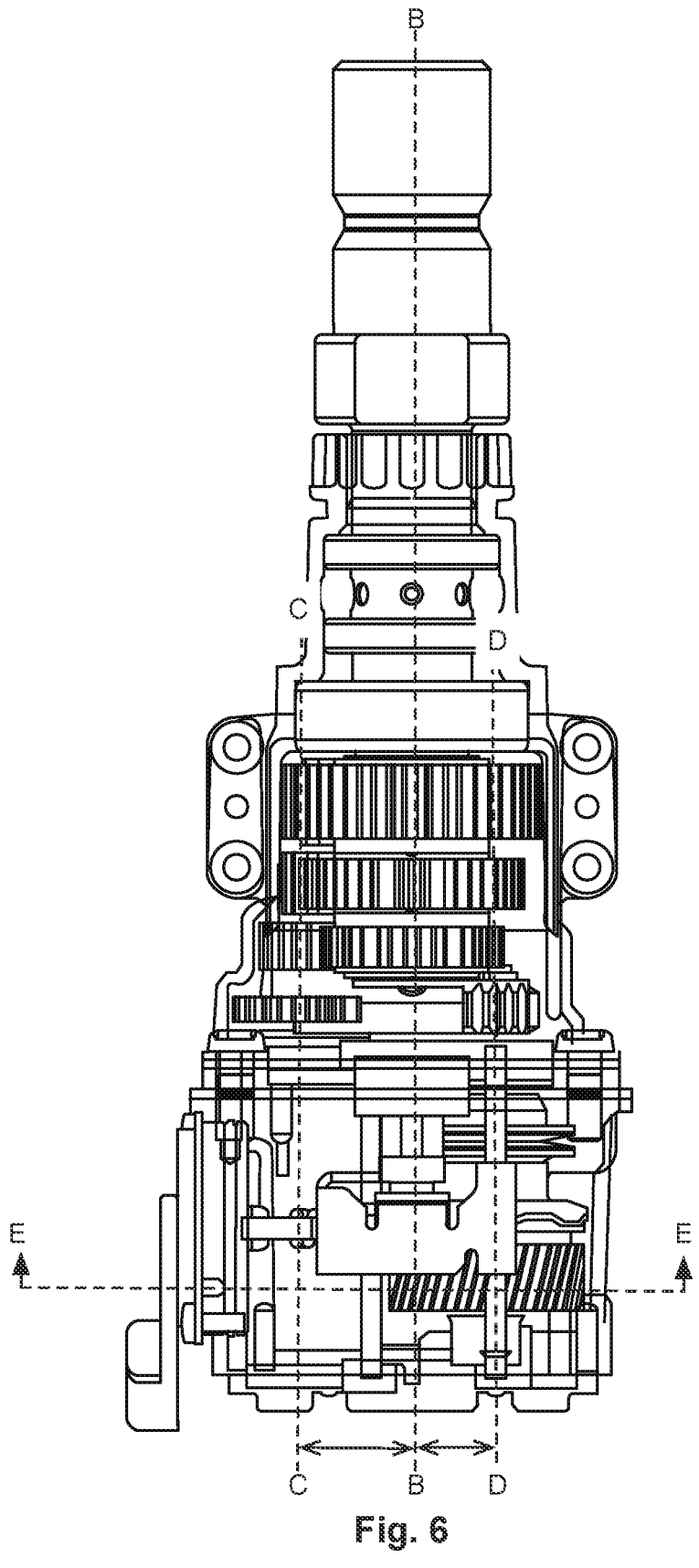
FIG. 6 is a plan view of a transmission according to an example.

The motor drive shaft is coupled to the output shaft 202 via an input shaft 218 and an intermediate shaft 216. The intermediate shaft 216 is configured to rotate about the intermediate shaft rotation axis C-C as shown in FIGS. 2 and 6. The intermediate shaft rotation axis C-C is parallel to the output shaft rotation axis B-B.

The intermediate shaft 216 comprises first idling gear 220, a second idling gear 222, and a third idling gear 224. The first idling gear 220, the second idling gear 222, and the third idling gear 224 are fixed to the intermediate shaft 216. This means that the first idling gear 220, the second idling gear 222, and the third idling gear 224 rotate together. The first idling gear 220, the second idling gear 222, and the third idling gear 224 are respectively configured to operatively engage the first gear 206, the second gear 208 and the third gear 210. In some examples, the first idling gear 220, the second idling gear 222, and the third idling gear 224 are integral with the intermediate shaft 216. For example, the first idling gear 220, the second idling gear 222, the third idling gear 224 and the intermediate shaft 216 are cast in one single element.

The first idling gear 220, the second idling gear 222, and the third idling gear 224 are always engaged respectively the first gear 206, the second gear 208 and the third gear 210. This means that all of the first gear 206, the second gear 208 and the third gear 210 rotate when the intermediate shaft 216 rotates. However, only one of the first gear 206, the second gear 208 and the third gear 210 is operatively coupled to the output shaft 202 and transmits torque thereto. As mentioned above, the other of the first gear 206, the second gear 208 and the third gear 210 will idle e.g., rotate, but not transmit torque to the output shaft 202.

The intermediate shaft 216 is operatively connected to the motor drive shaft via the input shaft 218. The input shaft 218 is configured to rotate about the input shaft rotation axis D-D as shown in FIGS. 2 and 6. The intermediate shaft rotation axis D-D is parallel to the output shaft rotation axis B-B and the input shaft rotation axis C-C. The input shaft 218 comprises a first reduction pinion 226 and a second reduction pinion 228. The first reduction pinion 226 engages a motor drive pinion 108 mounted on the motor drive shaft. The second reduction pinion 228 engages a reciprocal reduction gear 230 mounted on the intermediate shaft 216.

The input shaft 218 further optionally comprises a clutch 232. The clutch 232 is configured to disengage when the torque exerted thereon exceeds a predetermined torque threshold. In this way, the clutch 232 protects the electric motor 104 and/or the transmission 200 from excessive torque exerted thereon.

Whilst the Figures show the transmission 200 comprises an output shaft 202, an intermediate shaft 216 and an input shaft 218 operatively coupled to the electric motor 104 via different gearings. However, in some examples the transmission 200 optionally does not include the input shaft 218. In this case, the clutch 232 if required can be positioned on either the intermediate shaft 216 or the output shaft 202 and the intermediate shaft 216 is coupled to the motor drive pinion 108. The gear selection mechanism 234 described in reference to the examples below can operate without the input shaft 218.

Gear Selection and Synchronisation Pockets

Figure 4:
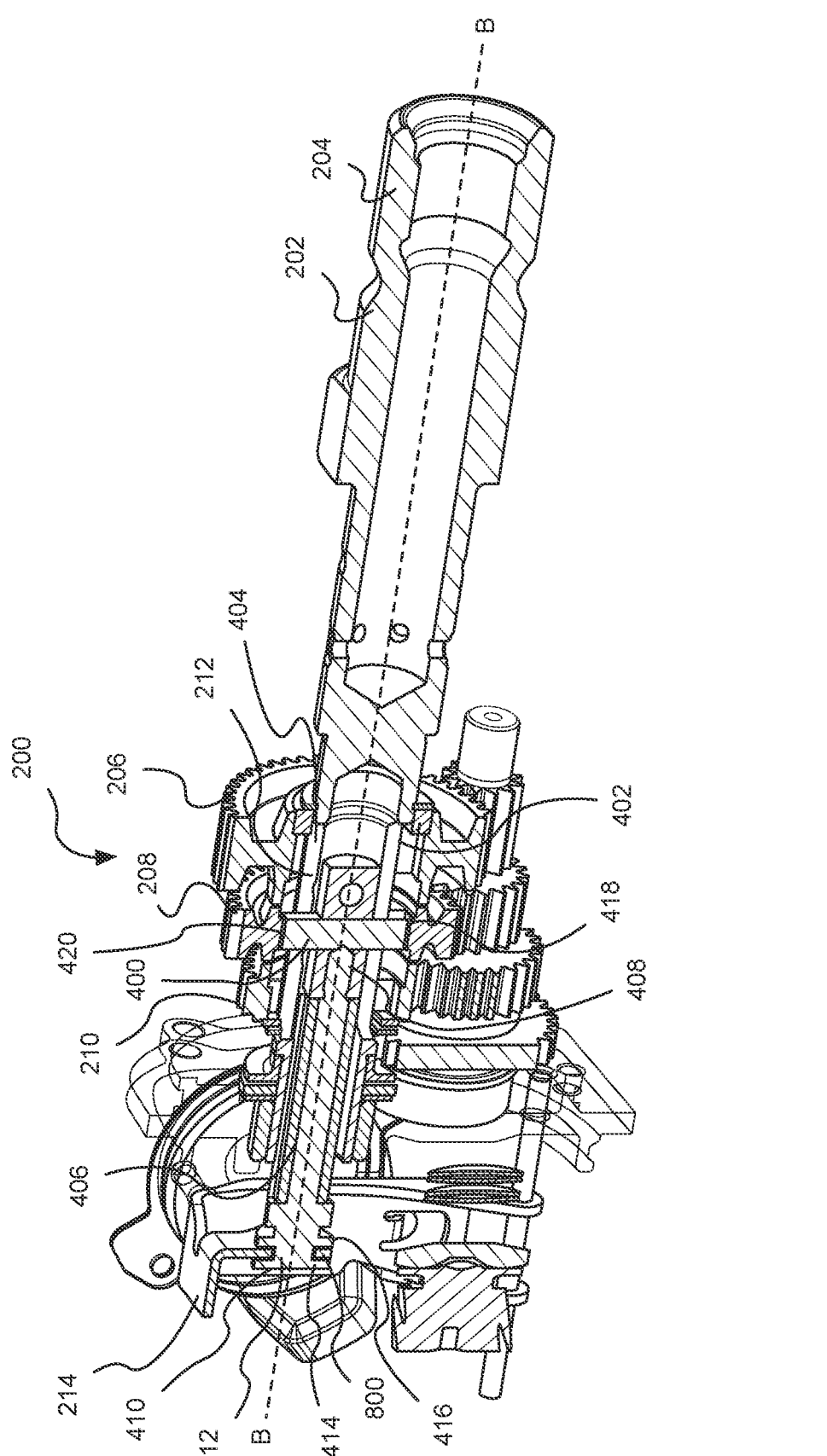
FIG. 4 shows a perspective cross-sectional view of a transmission according to an example.

As mentioned above, the user is able to select the gearing of the transmission 200. Reference will now be made to FIG. 4 to describe this in more detail. FIG. 4 shows a perspective cross-sectional view of the transmission 200. Each of the first gear 206, the second gear 208 and the third gear 210 are partially cut away in FIG. 4 to show the hollow interior of the gear sleeve 212.

As mentioned above, of the first gear 206, the second gear 208 and the third gear 210 are rotatably mounted on the gear sleeve 212. The gear sleeve 212 fixed with respect to the output shaft 202. The gear sleeve 212 is fixed to the output shaft 202 with any suitable fastening e.g., a C clip, welding, friction fit etc. In other examples, the gear sleeve 212 and the output shaft 202 are integral with each other.

Figure 5:
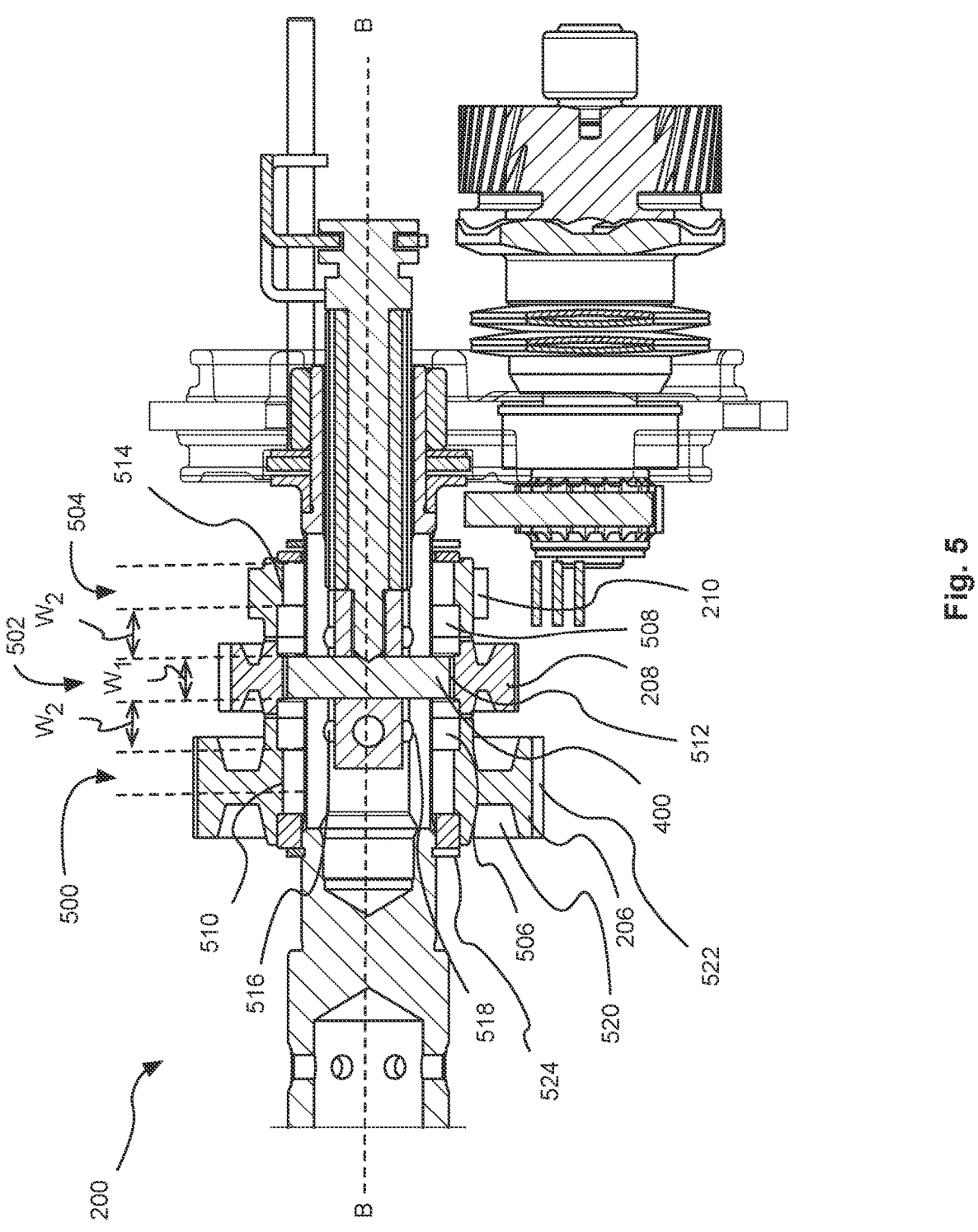
FIG. 5 shows a close-up cross-sectional side view of a transmission according to an example.

The gear sleeve 212 is hollow and configured to receive a moveable gear selection key 400. The gear selection key 400 is moveable between at least a first position 500 and a second position 502. As shown in FIG. 4, the gear selection key 400 is moveable between a first position 500 corresponding to the first gearing, a second position 502 corresponding to the second gearing and a third position 504 corresponding to the third gearing. The first position 500, the second position 502 and the third position 504 of the gear selection key 400 are best shown in FIG. 5.

The number of different positions that the gear selection key 400 is moveable between is the same as the number of different gearings on the gear sleeve 212. As mentioned above, in some examples the transmission 200 has a different number of gearings e.g., 2, 4, 5 etc. In this case, the gear selection key 400 is respectively moveable between 2, 4, 5 positions.

The gear selection key 400 as shown in FIG. 4 is in the second position 502, corresponding to the second gearing of the transmission 200. The gear selection key 400 is configured to couple the first gear 206 to the output shaft 202 in the first position 500 such that the torque is transmitted from the electric motor 104 to the tool holder 204 via the first gear 206. Similarly, the gear selection key 400 is configured to couple the second gear 208 to the output shaft 202 in the second position 502 such that the torque is transmitted from the electric motor 104 to the tool holder 204 via the second gear 208. Furthermore, the gear selection key 400 is likewise configured to couple the third gear 210 to the output shaft 202 in the third position 504 such that the torque is transmitted from the electric motor 104 to the tool holder 204 via the third gear 210.

The gear selection key 400 projects out of the gear sleeve 212 through an elongate first and second sleeve slots 402, 404. The first and second elongate sleeve slots 402, 404 extend in a direction parallel with the output shaft rotation axis B-B. The first and second elongate sleeve slots 402, 404 allow relative movement of the gear selection key 400 along the output shaft rotation axis B-B with respect to the gear sleeve 212. Accordingly, when the gear selection key 400 moves along the first and second elongate sleeve slots 402, 404, the gear selection key 400 engages the first, second or third gears 206, 208, 210.

The gear selection key 400 projects out of the gear sleeve 212 in two directions e.g., through the elongate first and second sleeve slots 402, 404. This means that the gear selection key 400 can securely engage the interior surface of the first gear 206, the second gear 208 or the third gear 210 in two different places. However, in some other examples the gear selection key 400 only projects out of the gear sleeve 212 in one direction e.g., through the elongate first or second sleeve slots 402, 404. In this case, the gear selection key 400 only engages the interior surface of the first gear 206, the second gear 208 or the third gear 210 in a single place.

The gear selection key 400 is mounted at a first rod end 408 of a gear selection rod 406. The gear selection rod 406 is configured to slide in a direction along the output shaft rotation axis B-B. The gear selection rod 406 is fixed with respect to the gear selection key 400 and rotates together with the gear selection key 400. The gear selection rod 406 is coupled to the selection bracket 214 at a second rod end 410 of the gear selection rod 406. The gear selection rod 406 is rotatably mounted in selection bracket 214. A collar portion 412 of the gear selection rod 406 is rotatably engaged with a clip arm 800 (best shown in FIG. 8) of the selection bracket 214. Movement of the clip arm 800 with respect to the collar portion 412 along the output shaft rotation axis B-B is prevented by first and second rod flanges 414, 416.

FIG. 5 shows a close-up cross-sectional side view of the transmission 200. FIG. 5 also shows the gear selection key 400 in the second position 502. That is the gear selection key 400 is in engagement with the second gear 208. For the purposes of clarity, the intermediate shaft 216 and the first, second, and third idling gears 220, 222, 224 are not shown.

As mentioned above, each of the first, second, and third gears 206, 208, 210 can rotate independently of each other. In order to select the different gearings of the transmission 200, the gear selection key 400 and the gear selection rod 406 move in a longitudinal direction along the output shaft rotation axis B-B.

FIG. 5 shows the different positions of the gear selection key 400. The first position 500 of the gear selection key 400 is the location of the gear selection key 400 when the gear selection key 400 is in engagement with the first gear 206. The second position 502 of the gear selection key 400 is the location of the gear selection key 400 when the gear selection key 400 is in engagement with the second gear 208. The third position 504 of the gear selection key 400 is the location of the gear selection key 400 when the gear selection key 400 is in engagement with the third gear 210. The gear selection key 400 respectively selects the first gearing, the second gearing and the third gearing when in the first position 500, the second position 502, and the third position 504.

In order to prevent the first, second, third gears 206, 208, 210 from jamming when the gear selection key 400 moves, the first, second, third gears 206, 208, 210 are sufficiently spaced from each other along the output shaft rotation axis B-B. This means that when the gear selection key 400 moves from the first position 500 to the second position 502, the gear selection key 400 does not engage the second gear 208 before disengaging the first gear 206.

The transmission 200 comprises a first synchronisation pocket 506 and a second synchronisation pocket 508 for receiving the gear selection key 400. The first synchronisation pocket 506 is configured to receive the gear selection key 400 when the gear selection key 400 moves between the first position 500 and the second position 502. The second synchronisation pocket 508 is configured to receive the gear selection key 400 when the gear selection key 400 moves between the second position 502 and the third position 504.

The first gear 206, the second gear 208, and the third gear 210 respectively comprise at least one first key slot 510, at least one second key slot 512, and at least one third key slot 514 for receiving the gear selection key 400 in the first position 500, the second position 502 and the third position 504.

In some examples, the gear selection key 400 comprises a rectangular cross-sectional shape. In other examples, the gear selection key 400 can comprise any suitable cross-section shape. However, the gear selection key 400 must mate with the first gear 206, the second gear 208 or the third gear 210 in order to transmit torque thereto.

In some examples the first key slot 510, the second key slot 512, and the third key slot 514 are configured to engage a first end 418 (best shown in FIG. 4) of the gear selection key 400. In another example, the first key slot 510, the second key slot 512, and the third key slot 514 are configured to engage the first end 418 and a second end 420 of the gear selection key 400. In some examples, the first key slot 510, the second key slot 512, and the third key slot 514 are formed from separate pairs of projecting ribs (not shown) configured to receive the gear selection key 400 therebetween. In some other examples, the first key slot 510, the second key slot 512, and the third key slot 514 are formed from a recess in the first gear 206, the second gear 208, and the third gear 210.

In some examples, the first gear 206, the second gear 208, and the third gear 210 can engage the gear selection key 400 in one rotational position with respect to the gear selection key 400. This means that the first, second and third gears 206, 208, 210 may have to rotate up to a full revolution before the first key slot 510, the second key slot 512, and the third key slot 514 can engage the gear selection key 400.

In some other examples, the first gear 206, the second gear 208, and the third gear 210 can engage the gear selection key 400 in a plurality of different rotational positions with respect to the gear selection key 400. Accordingly, the first gear 206, the second gear 208, and the third gear 210 each respectively comprise a plurality of pairs of first key slots 510, second key slots 512, and third key slots 514. This means that the first, second and third gears 206, 208, 210 may have to rotate part of a full revolution before engaging with the gear selection key 400.

The first synchronisation pocket 506 and a second synchronisation pocket 508 have a pocket width $W_2$ in a direction along the output shaft rotation axis B-B which is greater than a key width $W_1$ of the gear selection key 400 in a direction along the output shaft rotation axis B-B. This means that the gear selection key 400 cannot engage two gears at the same time and the gear selection key 400 is disengaged from one gear before engaging another gear. For example, as shown in FIG. 5, the gear selection key 400 will completely disengage from the second gear 208 before engaging the first gear 206 or the third gear 210.

In some examples, the pocket width $W_2$ of the first synchronisation pocket 506 and a second synchronisation pocket 508 are the same. In some other examples, the pocket width W2 of the first synchronisation pocket 506 and a second synchronisation pocket 508 can be different.

In some examples, the gear selection key 400 optionally comprises at least one spring-loaded locking ball 516. The spring-loaded locking ball 516 is configured to engage with a reciprocal locking detent 518 on an inner surface of the gear sleeve 212.

The gear selection key 400 in some examples comprises a plurality of spring-loaded locking balls 516 (not shown) circumferentially spaced around the gear selection rod 406. By providing a plurality of spring-loaded locking balls 516, the gear selection key 400 can be better held in the first, second or third position 500, 502, 504.

Similarly, the gear sleeve 212 comprises a plurality of reciprocal locking detents 518 circumferentially spaced around the inner surface of the gear sleeve 212. In some other examples, the gear sleeve 212 comprises two coaxial holes (not shown) which are configured to engage with two spring-loaded locking balls. In some examples, and as shown in the Figures, the reciprocal locking detent 518 is an annular recess formed on the inside of the gear sleeve 212.

The inner surface of the gear sleeve 212 further comprises plurality of reciprocal locking detents 518 e.g., annular recesses spaced longitudinally along the output shaft rotation axis B-B. In this way, the reciprocal locking detents 518 are positioned corresponding to the first position 500, the second position 502 and the third position 504. This means that the user feels positive feedback when the gear selection rod 406 and the gear selection key 400 audibly clicks into place when positioned correctly in the first, second and third positions 500, 502, 504.

Figure 8:
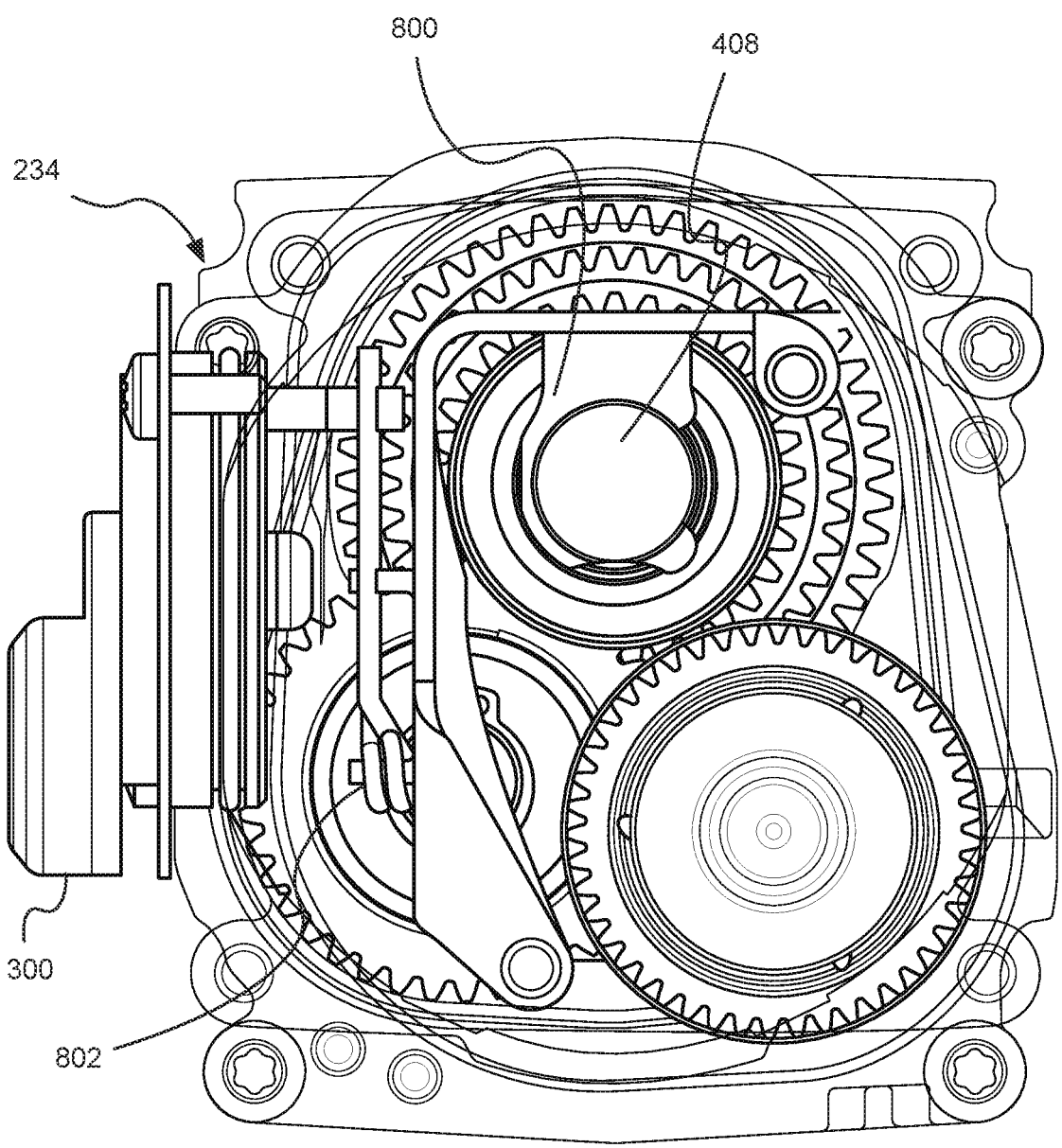
FIG. 8 is a cross sectional views across a first plane E-E as shown in FIG. 6 according to an example.

In some examples, the gear selection key 400 is urged into engagement with the first gear 206, the second gear 208 or the third gear 210 with a synchronisation spring 802 (as best shown in FIG. 8). The synchronisation spring 802 is coupled to the selection bracket 214 and configured to exert a returning force on the selection bracket 214. In turn the selection bracket 214 transmits the returning force to the gear selection rod 406 and the gear selection key 400. In some examples, the synchronisation spring 802 is configured to urge the gear selection key 400 into the second position 502. However, in other examples the synchronisation spring 802 is configured to urge the gear selection key 400 into the first position 500 or the third position 504. In some examples, the synchronisation spring 802 does not exert a sufficiently high returning force to move the gear selection actuator 300, unless moved by the user first. In other words, the frictional forces between the gear selection actuator 300 and the housing 102 are greater than the returning force from the synchronisation spring 802. Alternatively, in some other examples the gear selection key 400 comprises an additional locking spring-loaded ball (not shown) configured to keep a selection lever e.g. the gear selection actuator 300 in place. The additional locking spring-loaded ball also provides haptic click feedback to user for correct preselection of the gear selection actuator 300.

In some examples, the first gear 206, the second gear 208 and the third gear 210 comprises at least one weight reduction pocket 520 between a gear periphery 522 and a gear center 524. The weight reduction pocket 520 reduces the overall weight of the transmission 200 and makes the power tool 100 easier to handle for the user. For the purposes of clarity the weight reduction pocket 520 has been labelled only on the first gear 206 in FIG. 5. However, in some alternative examples all of the first gear 206, the second gear 208 and the third gear 210 may comprise the weight reduction pocket 520. In some other examples only the first gear 206, and the second gear 208 comprise the weight reduction pocket 520. This is because the third gear 210 in some examples is too thin to comprise a weight reduction pocket 520. In some examples, the weight reduction pocket 520 is an annular groove 520 between the gear periphery 522 and the gear center 524. In some examples both sides of the first gear 206, the second gear 208 and the third gear 210 comprises the weight reduction pockets 520.

Compact Arrangement

Figure 7:
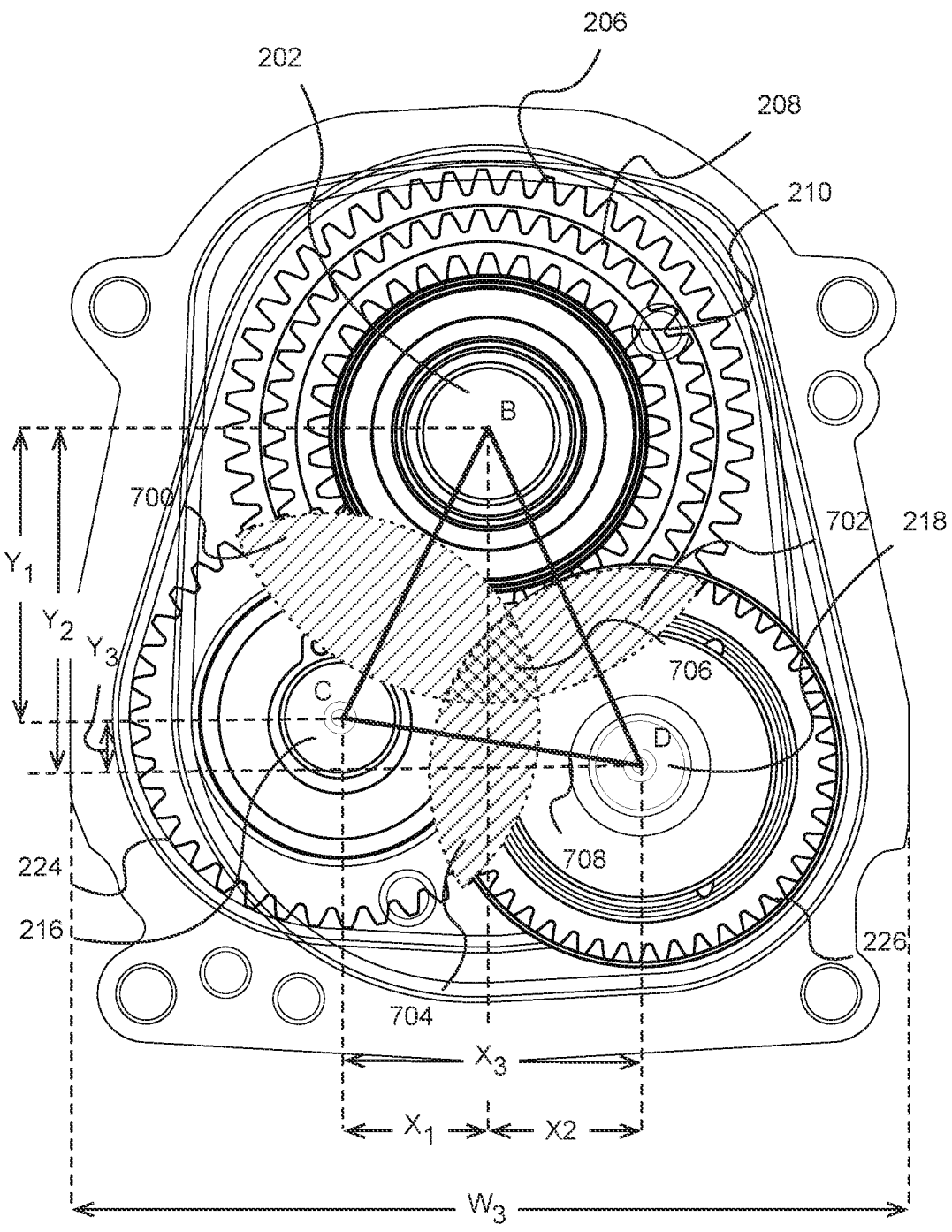
FIG. 7 is a cross sectional views across a first plane E-E as shown in FIG. 6 according to an example.

The power tool 100 and the transmission 200 comprises a compact arrangement. This means that the power tool 100 is easier to use in tight spaces. Reference will now be made to FIGS. 6, 7 and 8 to describe the compact arrangement of the transmission 200 in more detail. FIG. 6 is a plan view of the transmission 200. FIGS. 7 and 8 are cross sectional views across a first plane E-E as shown in FIG. 6. FIG. 7 does not show the components of the gear selection mechanism 234 for the purposes of clarity. The components of the transmission 200 are projected onto the first plane E-E in FIG. 7.

FIG. 7 shows the output shaft 202, the intermediate shaft 216 and the input shaft 218. Each of the output shaft rotation axis B-B, the intermediate shaft rotation axis C-C, and the input shaft rotation axis D-D are offset from each other in a first offset direction X and a second offset direction Y. In some examples, the first offset direction X and the second offset direction Y are perpendicular to each other and both perpendicular to e.g., the output shaft rotation axis B-B, the intermediate shaft rotation axis C-C, and the input shaft rotation axis D-D.

The output shaft rotation axis B-B is offset from the intermediate shaft rotation axis C-C and the input shaft rotation axis D-D in the first offset direction X respectively by $X_1$ and $X_2$. The intermediate shaft rotation axis C-C is offset from the input shaft rotation axis D-D in the first offset direction X by $X_3$. In some examples, offsets $X_1$, $X_2$, $X_3$, are different. In other examples one or more of the offsets $X_1$, $X_2$, $X_3$, are the same (not shown).

The output shaft rotation axis B-B is offset from the intermediate shaft rotation axis C-C and the input shaft rotation axis D-D in the second offset direction Y respectively by $Y_1$ and $Y_2$. The intermediate shaft rotation axis C-C is offset from the input shaft rotation axis D-D in the second offset direction Y by $Y_3$. In some examples, offsets $Y_1$, $Y_2$, $Y_3$, are different. In other examples one or more of the offsets $Y_1$, $Y_2$, $Y_3$, are the same (not shown).

This means that the output shaft rotation axis B-B, the intermediate shaft rotation axis C-C and the input shaft rotation axis D-D when projected on to a first plane E-E perpendicular to the output shaft rotation axis B-B, the output shaft rotation axis B-B, the intermediate shaft rotation axis C-C and the input shaft rotation axis D-D are arranged in an irregular triangle formation 708 as shown in FIG. 7.

This means that at least a portion of the components mounted on the output shaft rotation axis B-B, the intermediate shaft rotation axis C-C and the input shaft rotation axis D-D are able to overlap each other. For example, the first gear, 206, the second gear 208 and the third gear 210 on the output shaft 202 overlap with the third idling gear 224 on the intermediate shaft 216 in first overlap area 700. Similarly, the first gear 206, the second gear 208 and the third gear 210 on the output shaft 202 overlap with the first reduction pinion 226 on the input shaft 218 in a second overlap area 702. The third idling gear 224 on the intermediate shaft 216 overlaps with the first reduction pinion 226 on the input shaft 218 in a third overlap area 704.

In some examples, as shown in FIG. 7, all of the first gear 206, the second gear 208 and the third gear 210 on the output shaft 202, the third idling gear 224 on the intermediate shaft 216 and the first reduction pinion 226 on the input shaft 218 over with each other in fourth overlap area 706. Optionally, in other examples the fourth overlap area 706 is not provided.

Since each of the output shaft rotation axis B-B, the intermediate shaft rotation axis C-C, and the input shaft rotation axis D-D are offset from each other in a first offset direction X and a second offset direction Y, the transmission 200 can be more compact because the rotation axes B-B, C-C, D-D can be positioned closer to each other without the components mounted thereon interfering with each other. This allows a central volume within the transmission 200 represented by the fourth overlap area 706 to be more efficiently utilised.

Furthermore, since the gear selection mechanism 234 and the gear selection rod 406 is mounted within the output shaft 202, the transmission 200 is even more compact. This means that the gear selection mechanism 234 can be at least in part mounted within the transmission 200. Accordingly, the gear selection mechanism 234 is not required to be mounted adjacent to the side of the transmission 200. The housing 102 and the overall width W3 of the transmission 200 is reduced. This means that the power tool 100 is easier to use in restricted spaces.

Grease Chambers

Figure 9:
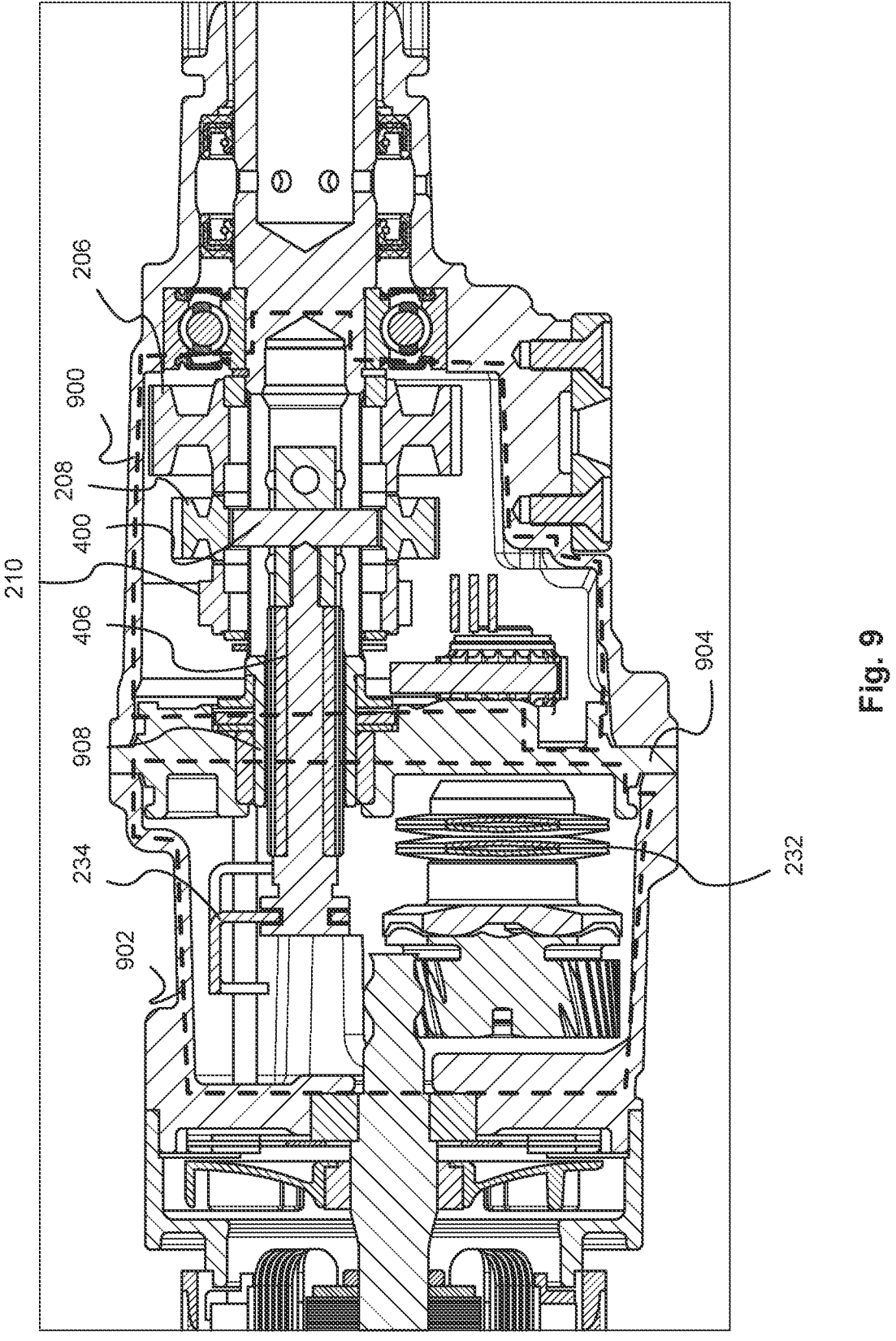
FIG. 9 shows a close-up view of the power tool as shown in FIG. 2 according to an example.

FIG. 9 shows a close-up view of the power tool 100 as shown in FIG. 2. FIG. 9 shows an example of the power tool 100 with the transmission 200 wherein a first part of the transmission 200 is mounted within a first grease chamber 900 and a second part of the transmission 200 is mounted within a second grease chamber 902.

The first grease chamber 900 and the second grease chamber 902 are indicated in FIG. 9 with thick dotted lines. The first grease chamber 900 and the second grease chamber 902 are internal volumes of the power tool 100 which comprise grease and one or more components of the power tool 100 e.g., components of the transmission 200.

By providing a separate first grease chamber 900 and a second grease chamber 902, the lubrication used for the transmission 200 can be compartmentalised. This prevents the lubrication e.g., grease from flowing away from parts of the transmission 200 when the power tool 100 is used in different orientations e.g., vertical, inverted, horizontal etc.

In some examples, the first grease chamber 900 and the second grease chamber 902 are defined at least in part by one or more walls of the housing 102. However, in some other examples the first grease chamber 900 and the second grease chamber 902 can be provided by additional walls or boxes inserted into the housing 102.

The first grease chamber 900 and the second grease chamber 902 as shown in FIG. 9 are separated by a baffle 904 fixed to the housing 102. The baffle 904 in some examples is a separate plate element which is connected between separate parts of the housing 102. In some examples the baffle 904 is sandwiched between the housing 102. In other examples, the baffle 904 is moulded and is an internal wall of the housing 102. In other words, the baffle 904 is integral with the housing 102.

In some examples, the first and second grease chambers 900, 902 are in fluid communication. The first and second grease chambers 900, 902 are connected via a grease connection conduit 908. The grease connection conduit 908 also optionally comprises at least part of the gear selection mechanism 234. As shown in FIG. 9, the gear selection rod 406 is slidable within the grease connection conduit 908 and connected to the gear selection key 400. In this way, there is a small volume between the wall of the grease connection conduit 908 and the gear selection rod 406 which contains grease. The grease in the grease connection conduit 908 lubricates the gear selection rod 406 and provides a more efficient and smoother gear selection mechanism 234 for the user.

In some examples, both the first and second grease chambers 900, 902 are sealed. This means that the grease does not escape to the outside of the housing 102. Since the first and second grease chambers 900, 902 are in fluid communication, some grease flows between the first and second grease chambers 900, 902. The first and second grease chambers 900, 902 comprise at least one port (not shown) for draining or topping up the grease in the first and second grease chambers 900, 902.

In some alternative examples, the first and second grease chambers 900, 902 are not in fluid communication. In this case, the first and second grease chambers 900, 902 are sealed off from each other. For example, the grease connection conduit 908 comprises at least one seal for preventing the grease flowing between the first and second grease chambers 900, 902.

The first grease chamber 900 as shown in FIG. 9 comprises the first gear 206, the second gear 208 and the third gear 210 on the output shaft 202. The first grease chamber 900 also houses the first idling gear 220, the second idling gear 222 and the third idling gear 224 on the intermediate shaft 216. The first idling gear 220, the second idling gear 222, the third idling gear 224 and the intermediate shaft 216 are not shown in FIG. 9.

FIG. 9 also shows the input shaft 218 and clutch 232 mounted in the second grease chamber 902. Furthermore, the gear selection mechanism 234 is mounted in the second grease chamber 902.

In some examples, a first lubricant type is held in the first grease chamber 900 and a second lubricant type is held in the second grease chamber 902. Since the grease connection conduit 908 only permits a limited amount of grease to flow between the first and second grease chambers 900, 902, the different types of grease can remain relatively unmixed.

As mentioned above, the first gear 206, the second gear 208 and the third gear 210 comprises at least one weight reduction pocket 520. Advantageously, the weight reduction pocket 520 is also configured to receive grease in the first grease chamber 900. This allows the first gear 206, the second gear 208 and the third gear 210 to be better lubricated.

Whilst FIG. 9 only shows a first grease chamber 900 and a second grease chamber 902, in other examples there can be more grease chambers (not shown). The additional grease chambers are further separated from each other by additional baffles 904.

In another example, two or more examples are combined. Features of one example can be combined with features of other examples.

Examples of the present disclosure have been discussed with particular reference to the examples illustrated. However, it will be appreciated that variations and modifications may be made to the examples described within the scope of the disclosure.

What is claimed is:

1. A power tool comprising:
   a housing;
   a motor mounted in the housing having a drive shaft;
   a transmission mounted in the housing having an input shaft operatively coupled to the drive shaft of the motor and an output shaft operatively coupled to a tool holder;
   wherein the transmission comprises at least a first gear and a second gear configured to transmit torque from the motor to the tool holder;
   wherein a first part of the transmission is mounted within a first grease chamber and a second part of the transmission is mounted within a second grease chamber; and
   wherein the transmission comprises a gear selection mechanism mounted in the second grease chamber.

2. The power tool according to claim 1, wherein the first grease chamber and the second grease chamber are defined at least in part by one or more walls of the housing.

3. The power tool according to claim 1, wherein the first grease chamber and the second grease chamber are separated by a baffle fixed to the housing.

4. The power tool according to claim 1, wherein the first grease chamber and the second grease chamber are in fluid communication.

5. The power tool according to claim 1 wherein the first grease chamber and the second grease chamber are not in fluid communication with each other.

6. The power tool according to claim 1, wherein the power tool is a core drill.

7. A power tool comprising:

a housing;

a motor mounted in the housing having a drive shaft;

a transmission mounted in the housing having an input shaft operatively coupled to the drive shaft of the motor and an output shaft operatively coupled to a tool holder;

wherein the transmission comprises at least a first gear and a second gear configured to transmit torque from the motor to the tool holder;

wherein a first part of the transmission is mounted within a first grease chamber and a second part of the transmission is mounted within a second grease chamber;

wherein the first grease chamber and the second grease chamber are in fluid communication; and wherein the first grease chamber and the second grease chamber are connected via a grease connection conduit.

8. The power tool according to claim 7, wherein a gear selection rod is moveable within the grease connection conduit.

9. A power tool comprising:

a housing;

a motor mounted in the housing having a drive shaft;

a transmission mounted in the housing having an input shaft operatively coupled to the drive shaft of the motor and an output shaft operatively coupled to a tool holder;

wherein the transmission comprises at least a first gear and a second gear configured to transmit torque from the motor to the tool holder;

wherein a first part of the transmission is mounted within a first grease chamber and a second part of the transmission is mounted within a second grease chamber; and wherein the first grease chamber and the second grease chamber are sealed.

10. The power tool according to claim 1, wherein the first grease chamber comprises the first gear and the second gear.

11. A power tool comprising:

a housing;

a motor mounted in the housing having a drive shaft;

a transmission mounted in the housing having an input shaft operatively coupled to the drive shaft of the motor and an output shaft operatively coupled to a tool holder;

wherein the transmission comprises at least a first gear and a second gear configured to transmit torque from the motor to the tool holder;

wherein a first part of the transmission is mounted within a first grease chamber and a second part of the transmission is mounted within a second grease chamber;

further comprising an intermediate shaft comprising a first idling gear and a second idling gear configured to respectively engage the first gear and the second gear;

wherein the first idling gear and the second idling gear are fixed with respect to each other and the first idling gear and the second idling gear are mounted in the first grease chamber.

12. A power tool comprising:

a housing;

a motor mounted in the housing having a drive shaft;

a transmission mounted in the housing having an input shaft operatively coupled to the drive shaft of the motor and an output shaft operatively coupled to a tool holder;

wherein the transmission comprises at least a first gear and a second gear configured to transmit torque from the motor to the tool holder;

wherein a first part of the transmission is mounted within a first grease chamber and a second part of the transmission is mounted within a second grease chamber; and wherein the transmission comprises a clutch and the clutch is mounted in the second grease chamber.

13. A power tool comprising:

a housing;

a motor mounted in the housing having a drive shaft;

a transmission mounted in the housing having an input shaft operatively coupled to the drive shaft of the motor and an output shaft operatively coupled to a tool holder;

wherein the transmission comprises at least a first gear and a second gear configured to transmit torque from the motor to the tool holder;

wherein a first part of the transmission is mounted within a first grease chamber and a second part of the transmission is mounted within a second grease chamber; and wherein a first lubricant type is held in the first grease chamber and a second lubricant type is held in the second grease chamber.

14. A power tool comprising:

a housing;

a motor mounted in the housing having a drive shaft;

a transmission mounted in the housing having an input shaft operatively coupled to the drive shaft of the motor and an output shaft operatively coupled to a tool holder;

wherein the transmission comprises at least a first gear and a second gear configured to transmit torque from the motor to the tool holder;

wherein a first part of the transmission is mounted within a first grease chamber and a second part of the transmission is mounted within a second grease chamber; and wherein at least one of the first gear or the second gear comprises at least one pocket between a gear periphery and a gear center configured to receive grease.

15. A power tool comprising:

a housing;

a motor in the housing, the motor having a drive shaft;

a transmission in the housing, the transmission having an input shaft operatively coupled to the drive shaft of the motor and an output shaft operatively coupled to a tool holder;

wherein the transmission comprises a first gear and a second gear configured to transmit torque from the motor to the tool holder;

an intermediate shaft comprising a first idling gear and a second idling gear configured to respectively engage the first gear and the second gear;

wherein the first idling gear and the second idling gear are fixed with respect to each other and the first idling gear and the second idling gear are mounted in a first grease chamber; and wherein a first part of the transmission is in the first grease chamber and a second part of the transmission is in a second grease chamber.

16. The power tool of claim 15, wherein the first grease chamber and the second grease chamber are defined at least in part by one or more walls of the housing.

17. The power tool of claim 15, wherein the first grease chamber and the second grease chamber are separated by a baffle fixed to the housing.

18. The power tool of claim 15, wherein the first grease chamber and the second grease chamber are in fluid communication.

19. The power tool of claim 18, wherein the first grease chamber and the second grease chamber are connected via a grease connection conduit.

20. A power tool comprising:

a housing;

a motor in the housing, the motor having a drive shaft;

a transmission in the housing, the transmission having an input shaft operatively coupled to the drive shaft of the motor and an output shaft operatively coupled to a tool holder;

wherein the transmission comprises a first gear and a second gear configured to transmit torque from the motor to the tool holder;

wherein a first part of the transmission is in a first grease chamber and a second part of the transmission is in a second grease chamber;

wherein the first grease chamber and the second grease chamber are defined at least in part by one or more walls of the housing;

wherein the first grease chamber and the second grease chamber are in fluid communication; and wherein the transmission comprises a clutch and the clutch is mounted in the second grease chamber; and wherein the transmission comprises a gear selection mechanism mounted in the second grease chamber.

\* \* \* \* \*